May 9, 1967 D. C. MEANS 3,318,202
PISTON AND PACKING CUP ASSEMBLY
Filed Sept. 29, 1964 2 Sheets-Sheet 1

INVENTOR.
Donald C. Means
BY
Attorney 3,318,202
PISTON AND PACKING CUP ASSEMBLY
Donald C. Means, Export, Pa., assignor to Westinghouse Air Brake Company, Wilmerding, Pa., a corporation of Pennsylvania
Filed Sept. 29, 1964, Ser. No. 400,261
1 Claim. (Cl. 92—245)

This invention relates to piston and packing cup assemblies and, more particularly, to an improved piston and packing cup assembly for use in a brake cylinder device or similar devices wherein the piston and packing cup are subjected to high differential pressures.

As is well known to those skilled in the art, a packing cup, when used in a brake cylinder device of a railway vehicle, is subjected to much stress and strain from the pressures acting thereon, to possible adverse effects of lubricants, and to wide ranges of atmospheric temperatures, all of which necessitate that a packing cup have qualities making it capable of withstanding the adverse effects of such conditions.

The need for an improved packing cup having the qualities for withstanding any adverse effects and for providing a longer service life than the packing cups presently used has long existed. Heretofore, packing cups have been commonly made of a rubber material with one or more layers of reinforcing fabric molded therein to provide strength, flexibility and sealing effect. In that the skirt or outer circumferential portion of the packing cup is curved in the form of a bight, the reinforcing fabric has a tendency to be displaced close to the surface on the concave side of the curved portion rather than remaining uniformly midway between the outer surfaces during the molding process. With the fabric disposed close to the surface, breaking of the fabric fibers is more apt to occur and result in a failure or rupture of the packing cup. A rubber packing cup reinforced with fabric is also, relatively speaking, bulky and heavy. Moreover, rubber is susceptible to corrosive action of lubricants which are necessary to operation of the brake cylinder device.

Wide temperature ranges to which a rubber packing cup is necessarily subjected when in service also presents problems such as shrinkage at extremely low temperatures, which shrinkage may, at times, cause sufficient withdrawal of the packing cup from the inner cylinder wall as to result in improper sealing contact therewith and may even result in a permanent set or deformation, while at high temperatures rubber tends to decompose and to become soft and tacky, thereby resisting smooth sliding action against the brake cylinder wall.

Accordingly, the object of the present invention is to provide an improved piston and packing cup assembly for use in railway brake cylinder devices or the like, in which assembly the packing cup is constructed of an oil-resistant material which is inherently flexible and of such durability as to not require any reinforcing fabric and is negligibly affected by temperatures included within its intended operating range.

The improved brake cylinder packing cup embodying the invention is molded from a polyurethane elastomer material to form a packing cup characterized by a comparatively thick peripheral skirt portion surrounding a relatively thin, flat central disc portion. The polyurethane elastomer type material provides a packing cup characteristically stronger, has a greater resistance to lubricants, is less affected by temperature changes and is comparatively lighter in weight than natural or synthetic rubber type materials from which presently known packing cups are made. Moreover, the elastomeric qualities also permit the polyurethane material to be processed by methods similar to those used in making the rubber type packing cup.

Results of comparative tests relating to "elongation" or the elastic qualities of natural rubber material and polyurethane elastomer indicated that, over a wide temperature range, the polyurethane material possesses elastic qualities far superior to the rubber material for use under the service conditions to which brake cylinder packing cups are subject. The specimens tested, each of identical prescribed dimensions, were samples of polyurethane material similar to that to be used in the new type packing cup herein disclosed and rubber material currently used in presently known rubber type packing cups. "Elongation," as referred to in the above-mentioned tests, is the amount which the elastic specimen can be stretched from its unstressed form before exceeding its elastic limit or the point at which it takes a set and fails to resume its original form. The results of the tests showed that the rubber material, which has a normal elongation of 200%, had only 26% elongation after being subjected continuously to a temperature of 212° F. for three days, whereas the polyurethane material, which has a normal elongation of 770%, actually increased to 774% elongation after being subjected continuously to a temperature of 250° F. for a period of seven days.

The nature and results of the tests above noted may be an indication as to one cause of leakage or failure in the rubber type packing cups. During extremely cold and freezing temperatures, the lading materials on a railway car, such as a hopper car, may become frozen into a solid mass, and it may be necessary to apply heat externally for thawing the materials before they can be unloaded or dumped. Heat may be applied either by radiation or direct flame at temperatures which may vary from 250° F. to 300° F., and possibly as high as 400° F., and such externally applied heat, therefore, if not carefully controlled or if the braking equipment, and particularly the brake cylinder, is not properly protected against such high temperatures for a prolonged period of time, may cause damage to the rubber packing cup in the brake cylinder and result in possible leakage. The polyurethane type packing cup, however, as evidenced from the results of the above-mentioned tests, would be unaffected by such application of heat to the equipment.

Results of tests conducted at extremely cold temperatures as low as −50° F. also indicated the polyurethane type packing cup to be superior to the rubber type cup. With the temperature of both types of packing cups reduced to −50° F., the polyurethane cup required less force for flexing than did the rubber type. In other tests in which both types of packing cups were mounted in brake cylinders of like dimensions and in which operating conditions were simulated at a temperature of −50° F., the polyurethane cup indicated no leakage, whereas the rubber cup had some leakage, notwithstanding that the outside diameter of the skirt portion of the polyurethane cup, at room temperature, was 0.086″ less than the rubber cup.

The two types of packing cups were also subjected to endurance tests consisting of 29,868 operating cycles at room temperature at the rate of one cycle every five minutes with 50 p.s.i. brake cylinder pressure. After these tests, the following observations were made: the brake cylinder with the polyurethane packing cup was uniformly lubricated, the polyurethane cup showed little or no signs of wear, and the skirt maintained 85% contact with the cylinder wall, whereas, the brake cylinder with the rubber packing cup showed more lubrication at one end, approximately 5% of the outer contact surface of the rubber cup was worn off, and the skirt maintained only 60% contact with the cylinder wall.

The results of the above-described tests, therefore, indicate that the new type packing cup herein proposed should greatly increase the service life period of such cups. At present, regulations require that packing cups used in brake cylinder devices of railway braking equipment be serviced and checked at intervals not exceeding four years. It is estimated that the rubber type packing cups presently in use provide, on the average, a service life covering two to three service inspection periods, whereas the expected service life of the polyurethane type packing cup will probably be more than double that of said rubber type.

*Description and operation*

Figure 1:
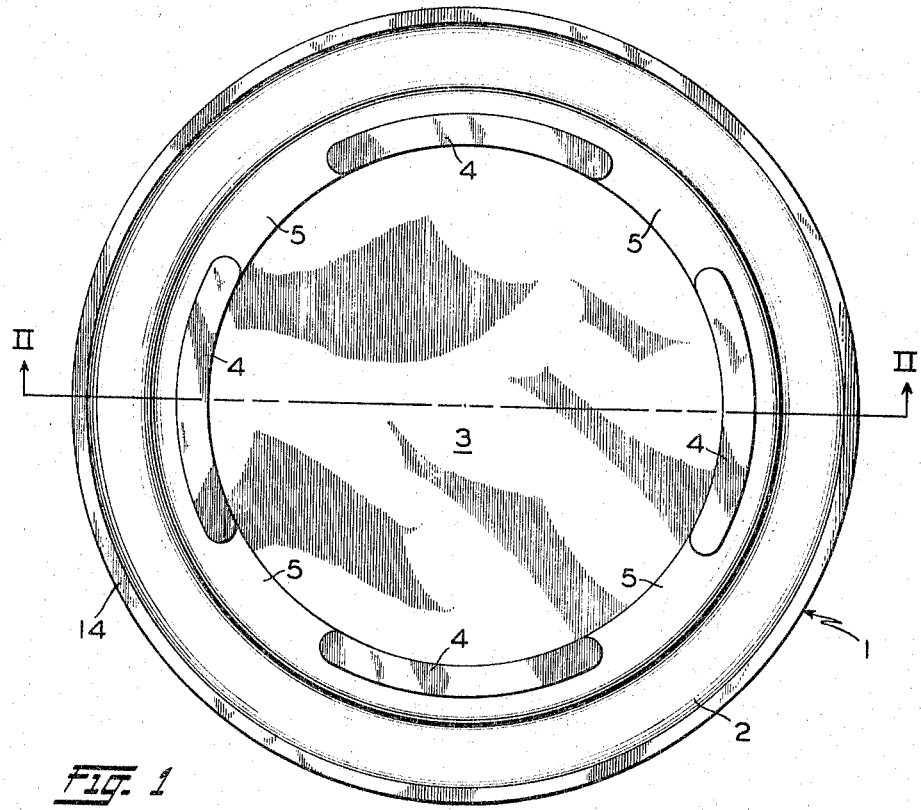
FIG. 1 is a plan view of a packing cup embodying the invention.

As shown in the several views of the drawings, an improved packing cup, designated generally by the reference numeral 1, comprises an annular skirt portion 2 having a bight or U-shaped cross-sectional shape and surrounding a flat, relatively thin central disc portion 3.

The packing cup 1 is molded from a polyurethane elastomer type material by a suitable method, the details of which are not deemed essential to an understanding of the invention. The polyurethane material used in making the improved packing cup 1 is essentially stronger and more desirable than rubber material ordinarily used for making heretofore-known packing cups, in that said polyurethane material is capable of withstanding greater pressures than rubber of the same thickness, is not susceptible to deterioration or corrosion due to lubricants as rubber is, and is not affected as greatly by extreme operating temperatures of a brake cylinder device as is rubber, which tends to break down and become soft and tacky at the higher operating temperatures and tends to shrink and become more rigid and brittle at the lower temperatures. The end result of such influence of temperatures on the rubber type packing cup, as noted in the above-mentioned tests, is that the packing cup, when operating under extremely variable temperatures, does not maintain uniform sealing pressure against the cylinder wall as well as the polyurethane packing cup 1.

Figure 3:
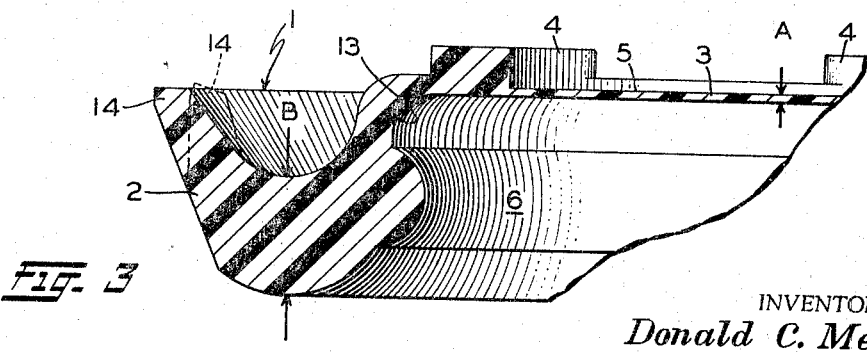
FIG. 3 is a fragmentary view, on a larger scale, of a portion of the packing cup shown in FIG. 2.

The skirt portion 2 of the packing cup 1 is relatively thicker and heavy compared to the membranous central disc portion 3, which is relatively thin, of the order of $\frac{1}{32}$ inch, for example, as indicated at A in FIG. 3, while the skirt portion may be of the order of $\frac{7}{16}$ inch thick through its heaviest cross-sectional portion, as indicated at B in FIG. 3. By way of comparison, the thickness of the central portion, or dimension A, of the rubber type packing cup may necessarily be as heavy as $\frac{1}{8}$ inch, or four times as heavy as central disc portion 3 of the polyurethane type packing cup. Due to the greater strength and other qualities afforded by the polyurethane material, as above described, the improved packing cup may be as much as 20% lighter in weight than the presently known rubber packing cups.

A number of arcuately shaped stops 4 are arranged about the outer rim of the central disc portion 3 adjacent the skirt portion 2 on the concave or high pressure side thereof. The stops 4, four of which are shown in this case, are equiangularly spaced with depressions or gaps 5 therebetween to provide communication between the pressure face of the central disc portion 3 and the pressure or concave side of the skirt portion 2. An annular inner lip 6 is formed on the inner surface of the convex or low pressure side of the skirt portion 2 adjacent to, but not adjoining, the central disc portion 3 on the side opposite the pressure face thereof.

Figure 2:
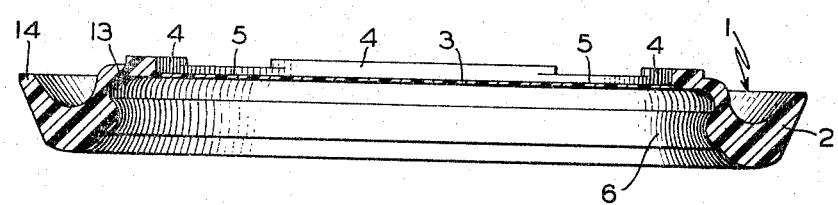
FIG. 2 is a sectional view of the packing cup shown in FIG. 1, taken along line II—II as viewed in the direction indicated by the arrows.
Figure 4:
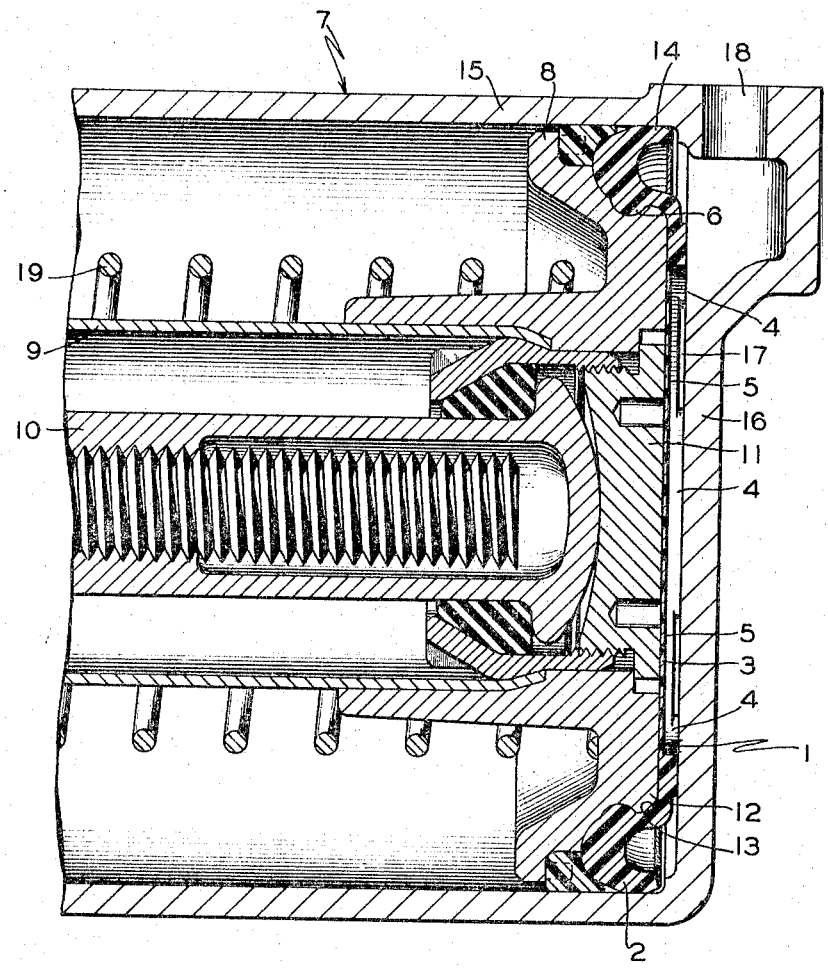
FIG. 4 is a fragmentary elevational view, mostly in section, showing the packing cup in its installed relationship to a brake cylinder device of which a portion is shown.

The packing cup 1 is shown in FIG. 4 of the drawings as it would be disposed in an installed position in a standard brake cylinder device 7 including a piston assemblage comprising a piston 8, a piston rod 9 and a push rod 10, all retained in an assembled relation by a plug type nut 11. The packing cup 1 is installed on the piston 8 by a snap-on action, that is, by simply forcing the inner annular lip 6 of the packing cup over a circumferential lip 12 formed on the piston 8, whereby the non-pressure side of the central disc portion 3 rests flatly against the adjacent complementary flat face of said piston, in which disposition the circumferential lip 12 rests within a complementarily countoured inner annular groove 13 (see FIGS. 2 and 3) formed in the packing cup between said inner annular lip and the circumference of said central disc portion. In view of the support provided against fluid pressure by the flat face of piston 8 and that of nut 11, which is flush therewith, to the central disc portion of the packing cup, it has been determined that a relatively thin dimension of the order of $\frac{1}{32}$ inch is adequate. This reduction in thickness of the central portion results in reduced weight and cost of material required.

The skirt 2 of the packing cup 1 has formed thereon an outer lip portion 14 having an outer peripheral surface the diameter of which, in the free unstressed state of the packing cup, diminishes uniformly from a largest diameter adjacent the free end of said outer lip portion to a smallest diameter adjacent the bight portion of the skirt, the respective dimensions of said largest and smallest diameters being such, as related to the diameter of the bore of a cylinder portion 15 of the brake cylinder device 7, that when the piston assemblage, with the packing cup installed thereon, is operably disposed in said cylinder portion, a certain portion of said outer lip portion is diametrally constricted within said cylinder portion and, therefore, exerts a reactive sealing force around its circumference against the surface of the wall of the bore in said cylinder portion. Though not necessarily limited to such, the outer lip portion 14 of the packing cup 1, in this instance, is of such dimension diametrically that, when in its operating disposition, approximately one-half of the external peripheral surface of the outer lip portion is brought into sliding and sealing contact with the surface of the wall of the bore of cylinder portion 15, as shown in FIG. 4. The distorted shape assumed by the skirt portion 2, when in its installed disposition, is also shown in phantom outline in FIG. 3. The purpose of the relatively thick and heavy structure of the skirt portion 2, particularly at the bight portion of the corrugation, is to provide the skirt with sufficient biasing effect to insure constant sealing contact of the outer lip 14 with the inner wall of the cylinder 15 with a substantially uniform pressure under the wide range of temperatures to which the brake cylinder device 7 is subject under service conditions and at the same time eliminate any need for reinforcing fabric. The axial thickness of the bight portion or the dimension B of the skirt 2, therefore, is such that a substantial portion of the outer surface of the lip portion 14 making sliding and sealing contact with the bore surface of cylinder portion 15, is axially spanned thereby so as to provide the necessary support and biasing effect for said lip portion against said bore surface. Moreover, the use of polyurethane material in the packing cup makes it possible to povide the relatively thick bight portion without failure of the bight portion under service conditions.

As is well known, the pressure side of the packing cup 1 oppositely faces the inner side of a pressure head 16 of the brake cylinder device 7, said packing cup and pressure head, along with cylinder portion 15, cooperating to define a pressure chamber 17 to which actuating pressurized fluid may be supplied via a port 18. The release position of the piston 8, in which position the brakes (not shown) on the vehicle are released, is defined by abutment of the stops 4 with the pressure head portion 16, in which release position said piston is shown in the drawings.

The brake cylinder device 7 operates in a well-known manner to effect a brake application on the vehicle when pressurized fluid is supplied to pressure chamber 17 to act against the pressure side of the packing cup 1 and thereby cause piston 8 to be moved in a left-hand direction, as viewed in the drawing, against the opposing force of a return spring 19 which acts to return the piston 8 to its release position upon release of fluid pressure from pressure chamber 17.

Having now described the invention, what I claim as new and desire to secure by Letters Patent is:

A piston assembly and cylinder comprising:
(A) a cylinder having a bore,
(B) a piston having a flat pressure face and a peripheral groove surrounding said piston, and
(C) a packing cup including:
  (a) a central flat disc-like portion of relatively thin membranous and uniform thickness of the order of $\frac{1}{32}$ of an inch supported against fluid pressure forces by said flat pressure face on said piston, and
  (b) a skirt in the form of an annular U-shaped channel integrally molded with said central disc-like portion in surrounding relation thereto, said skirt having:
    (i) an inner concentric cylindrical portion supporting said central disc-like portion and conformingly contoured to said peripheral groove so as to frictionally hold said packing cup on said piston,
    (ii) an outer cylindrical sealing lip portion,
    (iii) a bight portion integrally joining said outer sealing lip portion and said inner cylindrical portion and being of substantially greater thickness than said outer sealing lip portion and said inner cylindrical portion,
    (iv) said outer cylindrical sealing lip portion in its free condition, having an outer peripheral surface which is conically tapered from its free end toward the bight portion,
    (v) the outer sealing lip portion of said packing cup being peripherally constricted upon installation in said cylinder bore such that a certain portion of said outer peripheral surface contacts the wall of the cylinder bore in sealing and sliding relation, the amount of such contracting portion of said peripheral surface being such as to be axially spanned in part by said bight portion whereby said bight portion exerts a constant biasing effect on said outer sealing lip portion for effecting said sealing and sliding contact.

References Cited by the Examiner

UNITED STATES PATENTS

| 2,840,426 | 6/1958 | Salansky | 92—245 |
| 3,167,323 | 1/1965 | Appleton et al. | 277—205 |
| 3,183,795 | 5/1965 | Kirk | 92—212 |

MARTIN P. SCHWADRON, *Primary Examiner.*

G. N. BAUM, *Assistant Examiner.*